Feb. 6, 1940.   L. W. SCOFIELD   2,188,961
LAWN TRIMMING DEVICE
Filed Aug. 20, 1937   3 Sheets-Sheet 1
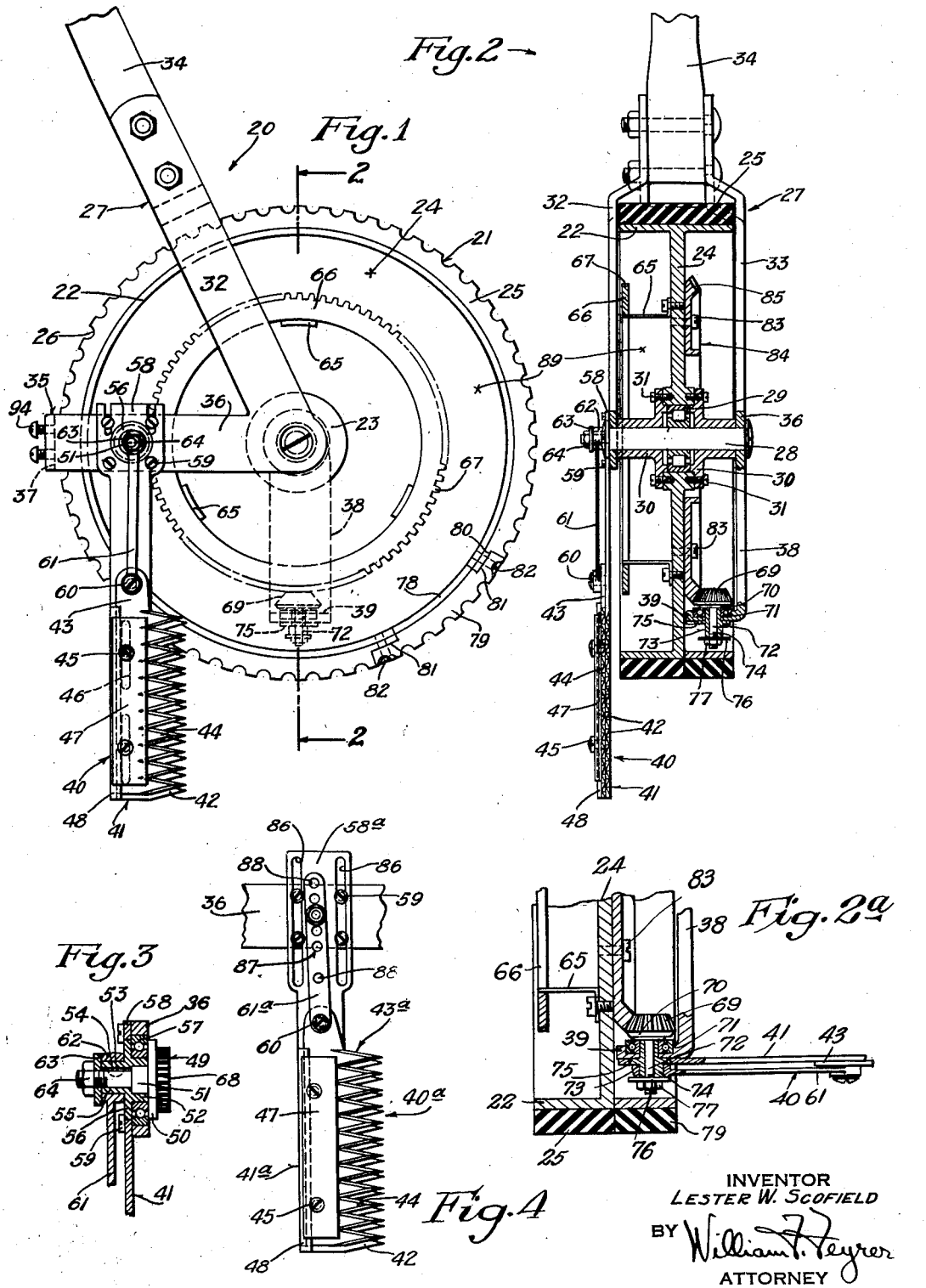
INVENTOR
LESTER W. SCOFIELD
BY William F. Peyrer
ATTORNEY

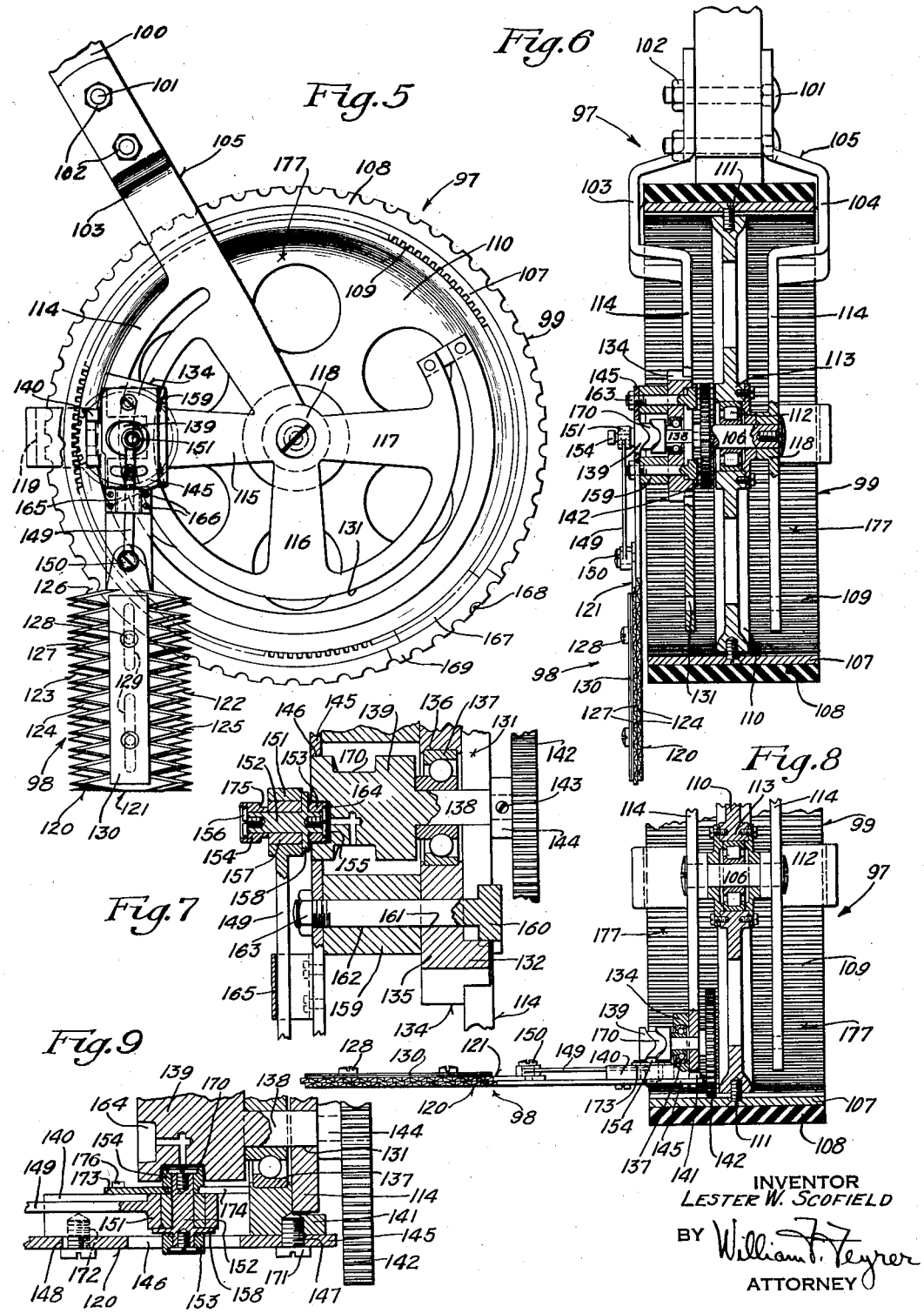

Feb. 6, 1940.  L. W. SCOFIELD  2,188,961
LAWN TRIMMING DEVICE
Filed Aug. 20, 1937  3 Sheets-Sheet 3
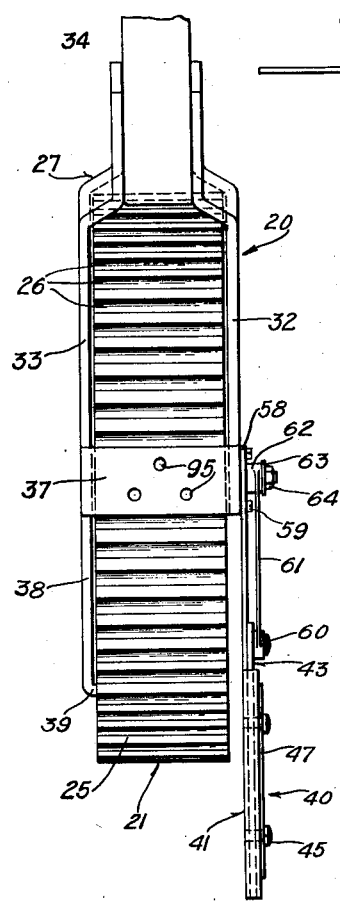
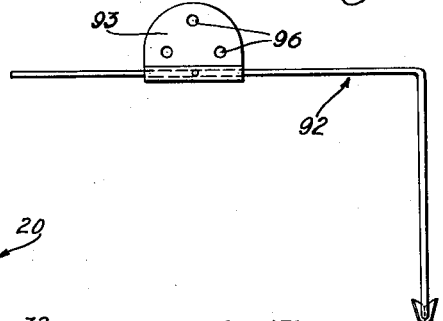
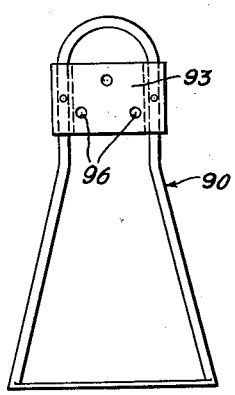
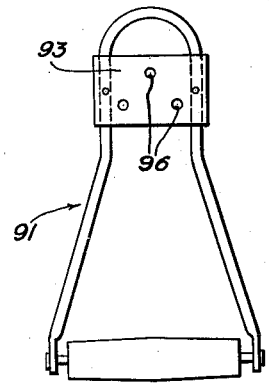
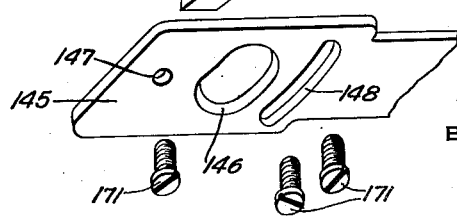
INVENTOR
LESTER W. SCOFIELD
BY William F. Heyner
ATTORNEY Patented Feb. 6, 1940

2,188,961

UNITED STATES PATENT OFFICE 2,188,961

LAWN TRIMMING DEVICE

Lester W. Scofield, Pound Ridge, N. Y., assignor to Frank Cataldo, Trinity Pass, New Canaan, Conn.

Application August 20, 1937, Serial No. 160,023

11 Claims. (Cl. 56—264)

This invention relates to lawn trimmers.

It is an object of the present invention to provide a lawn trimmer in which the cutter unit is of the reciprocating type and which is particularly adapted to trim the edges of lawns, as adpacent to walks, gardens and buildings where the conventional rotatory mower supported between two ground wheels cannot be used.

It is an object of the invention to provide a lawn trimmer in which the cutter unit may be selectively supported to cut in a vertical and a horizontal plane.

Accordingly, a feature of the invention resides in providing a lawn trimmer in which the cutter unit comprises a fixed cutter having a series of cutting teeth and a cooperating movable cutter having a series of cutting teeth, in which the cutting unit is supported to extend downwardly at one side of the carrying frame and in which the movable cutter is reciprocated longitudinally of the fixed cutter by a connection with the ground wheel.

Another feature of the invention resides in providing a lawn trimmer in which the cutter unit comprises a fixed cutter having a series of cutting teeth and a cooperating movable cutter having a series of cutting teeth, in which the movable cutter is reciprocated longitudinally of the fixed cutter by a connection with the ground wheel and in which the cutter unit may be selectively supported on the frame in vertical and horizontal positions.

Another feature of the invention resides in providing a lawn trimmer in which an arcuate guide is provided on the supporting frame, in which the cutter unit is movable with a carrier block on said guide to be located in divers positions relative to the frame and in which a gear is provided coaxial with the ground wheel and rotatable therewith to cooperate with a gear on said carrier to actuate said cutter unit.

Yet another feature of the invention resides in providing a lawn trimmer in which the gear driving means for the cutter unit is enclosed in an open sided housing of the ground wheel.

Another feature of the invention consists in providing a lawn trimmer provided with a means for supporting and operating the cutter unit at both sides of the ground wheel.

Other objects and features will hereinafter appear.

In the drawings:

Figure 1 is a side view of one form of the lawn trimmer.

Fig. 2 is a view taken on the line 2—2 of Fig. 1.

Fig. 2a is a fragmentary view, similar to Fig. 2, but showing the cutter unit in a horizontal position.

Fig. 3 is a detail view showing the manner in which the cutter unit is associated with the frame.

Fig. 4 is a detail view showing a modified mounting for the cutter unit.

Fig. 5 is a side view of a modified form of the invention.

Fig. 6 is a sectional view of the form shown in Fig. 5.

Fig. 7 is a fragmentary detail view showing the relation of the frame carrier block and cutter unit when in the position in Fig. 5.

Fig. 8 is a fragmentary view similar to Fig. 6 showing the cutter unit adjusted in a horizontal position.

Fig. 9 is a fragmentary detail view similar to Fig. 7, but showing the relation of the frame carrier block and cutter unit when in the position shown in Fig. 8.

Fig. 10 is an exploded detail view showing a construction of the carrier block and its relationship with the frame and cutter unit when the latter is supported in a horizontal position.

Fig. 11 is a rear view of the lawn trimmer shown in Fig. 1.

Figs. 12, 13 and 14 are detail views showing auxiliary devices which may be associated with the lawn trimmers.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring more particularly to the drawings and first to Figs. 1 through 3 and Fig. 11, there is disclosed a lawn trimming device 20 having a ground wheel 21, preferably formed with a rim 22 connected to a central hub portion 23 by a web 24. A rubber tire 25 with serrations 26 in the outer face thereof may, as shown, be advantageously mounted on the rim to improve traction.

Positioned at opposite sides of the ground wheel 21 is a main yoke frame member 27 which receives the main axle 28 to thus rotatably mount the ground wheel. Preferably a roller bearing 29 is incorporated in the hub portion 23 and maintained in position by the web 24 which is secured to flanges 30 on the hub portion by screws 31.

As shown the yoke member 27 is provided with a pair of arms 32 and 33 which extend upwardly to be suitably connected to opposite sides of a conventional handle 34. The yoke frame 27 includes also a horizontal U-shaped supporting section 35 having side arms 36 and an integral connecting plate 37, which extends rearwardly of the ground wheel. An arm 38 extending downwardly from the axle 28 at one side of the ground wheel and having an inturned horizontal flange 39 at the lower end thereof completes the yoke frame member.

Now of particular importance it is to be noted that the U-shaped section 35 and the downwardly extending arm 38 provides means for selectively supporting a cutter unit 40 in a vertical and horizontal position respectively, see especially Fig. 2, whereby the same may be used to trim not only the edge of a lawn but also to flat trim the lawn adjacent the edge.

The cutter unit 40 which may thus be selectively supported in horizontal and vertical positions comprises a fixed cutter 41 having a series of V-shaped cutting teeth 42 and a cooperating movable cutter 43 having a series of V-shaped cutting teeth 44 and mounted for reciprocatory movement longitudinally of the fixed cutter. Screws 45 on the fixed cutter and extending into slots 46 in the movable cutter serve to guide the latter during its reciprocatory movement. A spring plate 47 resting adjacent one edge of a longitudinal rib 48 on the fixed cutter and maintained in yielding engagement with the movable cutter by the screws 45, provides an efficient means for achieving a proper shearing relationship between the cutting teeth 42 and 44 of the respective cutters.

For operatively associating the cutter unit with the U-shaped section 35 and the ground wheel 21 to accomplish a vertical cut there is mounted on the inner side of one of the arms 36 a pinion gear 49 having a flange 50 and an integral stepped shaft 51 extending through the arm 36. As shown, a sleeve member 52 is inserted on the stepped shaft and secured thereto for rotation therewith by a key 53 in the shaft 51 which enters a keyway 54 in an outwardly projecting portion 55 of the sleeve 52. It is to be especially noted that the portion 55 of the sleeve is eccentric with respect to the shaft 51.

A flange portion 56 of the sleeve 52 and the flange portion 50 of the pinion gear 49, respectively overlying opposite sides of a ball bearing 57 suitably fixed to the arm 36 provides means for maintaining the keyed together shaft 51 and sleeve 52 in association with the U-shaped section.

As shown most clearly in Figs. 1 and 3, the fixed cutter 41 of the cutter unit 40 is provided at one end with a connecting plate 58 encircling the flange 56 of the sleeve 52 and fixed to the supporting frame arm 36 as by screws 59. To complete the mounting of the cutter unit the movable cutter 43 has connected adjacent one end by means of a pivot stud 60, a link 61 having a hub or bearing portion 62 mounted on the eccentric portion 55 of the sleeve 52. A bearing collar 63 on the shaft 51 and held thereon and against the hub portion 62 of the link 61 by a nut 64 in screw threaded relation with the shaft 51, serves to effectively maintain the shaft 51, eccentric 55 and movable cutter 43 in operative relation.

With this mounting and construction, as the eccentric 55 is rotated the movable cutter is caused to reciprocate and the teeth 42 and 44 on the cooperating cutters engage in shearing relation to trim the grass and the like that projects or hangs over the lawn edge.

To accomplish this actuation of the cutter unit in a most simple and effective manner there is coaxially associated with the ground wheel by means of brackets 65 suitably secured to and extending from one side of the web 24, a main gear 66 having teeth 67 engageable directly with teeth 68 on the pinion gear 49. Thus when the ground wheel 21 is moved over the lawn, as by the conventional handle 34, the main gear 66 is rotated therewith to concurrently rotate the pinion gear 49 and associated eccentric 55 to reciprocate the movable cutter 43.

When it is desired to support the cutter unit 40 to achieve a horizontal cut it is merely necessary to remove the screws 59, bearing collar 63 and nut 64, whereupon the cutter unit 40 may be pulled off of the sleeve 52. The collar 63 and nut 64 may then be replaced on the shaft 51 and the cutter unit 40 associated with the horizontal flange 39 on the downwardly extending arm 38 of the yoke frame 27.

As in the case of the side arm 36 of the U-shaped section 35 there is mounted on the upper side of the horizontal flange 39 a pinion gear 69 having a hub 70 engageable with a ball bearing 71 suitably fixed on the flange, and having a preferably integral shaft 72 extending through the bearing. A sleeve 73 having an eccentric portion 74 projecting downwardly from the supporting flange arm 39 and having a flange portion 75 engageable with the outer side of the flange arm 39 is keyed to the shaft 72 for rotation therewith.

With this construction, the cutter unit 40 may readily be supported in a horizontal position by merely securing the connecting plate 58 of the fixed cutter 41 to the supporting flange 39 by the screws 59 and by inserting the hub 62 of the link 61 on the eccentric 74, whereupon a collar 76 and nut 77, similar to the collar 63 and nut 64 heretofore described, may likewise be inserted on the shaft 72 to maintain the movable cutter 43 and eccentric 74 in operative association.

Preferably, and as shown most clearly in Fig. 1, a section 78 of the rim 22 and a section 79 of the tire 25 are made separable to facilitate the association and disassociation of the cutter unit 40 with the horizontal supporting flange 39. Cooperating shoulders 80 and 81 on the separable section 78 and main portion of the rim 22 respectively and adapted to receive screws 82 provide an advantageous means for securing the separable section 78 in position.

For rotating the pinion 69, which as shown is a bevel gear, to cause actuation of the movable cutter 43 through the eccentric 74 there is fixed, as by screws 83, to the side of the web 24 opposite the main gear 66, a main bevel gear 84 the teeth 85 of which are adapted to engage with the teeth of the pinion gear 69. Thus, when the cutter unit is supported in the horizontal position shown in dotted lines in Fig. 2, the movable cutter will, upon movement of the ground wheel over the lawn, be reciprocated to cooperate with the fixed cutter to achieve a horizontal cut.

It is to be noted that both of the main gears 66 and 84 and both the pinions 49 and 69 are at all times operatively associated with the ground wheel 21 and that the change-over from a vertical to a horizontal support of the cutter unit is a most simple operation. It is to be further noted that the rim 22 of the ground wheel 21 provides an open sided housing 89 for enclosing the driving gears for the cutter unit, thus making for a more compact device and one in which the gears are protected from stones, pebbles and the like which may be thrown upwardly by the cutter unit during the operation thereof.

If desired, in order that the cutter unit may be adjusted upwardly and downwardly when vertically supported, and inwardly and outwardly when horizontally supported, a modified cutter unit 40a, as shown in Fig. 4, may be utilized. This modified unit 40a is similar to the unit first described. In it, however, the connecting plate 58a of the fixed cutter 41a is formed with a pair of longitudinal slots 86 therein adapted to receive the connecting screws 59 and permit longitudinal adjustment of the cutter relative to the side arm 36 or horizontal flange 39 as the case may be. Also, in the modified unit the actuating link 61a of the movable cutter 43a is provided with a series 87 of holes 88. Thus when the fixed cutter is longitudinally adjusted through the pair of slots the movable cutter may be similarly adjusted by inserting the eccentric 55 or 74, as the case may be, in a proper one of the holes 88 in the link.

The main yoke frame 27 may also be used to support auxiliary devices such as the weed cutter 90, roller 91 and cultivator or marker 92 of Figs. 13, 14 and 12 respectively, through the provision of a connecting plate 37 on the U-section 35 adapted to receive and support plates 93 of the auxiliary devices, and to hold the latter thereon as by screws 94 in holes 95 and 96 in the connecting plate 37 and the plates 93 respectively.

Instead of the form disclosed in Figs. 1 through 4 and Fig. 11, a lawn trimmer 97 of the modified form disclosed in Figs. 5 through 9 may be utilized. Like the form first described this modified lawn trimmer includes a cutter unit 98 adapted to be vertically supported at one side of a ground wheel 99 to trim the projecting or overhanging grass at the lawn edge and to be also supported horizontally to effectively trim the lawn adjacent the lawn edge. With the modified form, however, it is possible to achieve a somewhat greater range in the adjustment of the cutter unit.

As shown clearly in Figs. 5 and 6 a conventional handle 100 is provided to which are secured at opposite sides thereof by bolts 101 and nuts 102 a pair of upwardly extending arms 103 and 104 of a main yoke frame member 105 on which is rotatably mounted by means of an axle 106 the ground wheel 99.

This ground wheel includes a rim 107 on which is preferably mounted a serrated rubber tire 108 and which on its inner face has formed an internal gear 109. A web 110 suitably secured to the rim 107 as by screws 111, and carrying a roller bearing 112 in the hub portion 113 thereof completes the ground wheel and serves to rotatably mount the same on the axle.

To provide a support for the cutter unit 98 the main frame 105 is formed with arcuate portions 114 at either side thereof integrally connected to the arms 103 and 104 and to radial arms 115, 116 and 117 extending from the central axle carrying portions 118 of the main yoke frame. As shown, the rearwardly extending radial arms 115 are joined by a connecting portion 119 to provide a U-shaped strengthening section for the yoke frame and to support auxiliary devices, such as shown in Figs. 12, 13 and 14.

The cutter unit 98 is generally similar to the unit 40 first described and includes a fixed cutter 120 and a movable cutter 121 mounted for reciprocatory movement longitudinally thereof. Preferably, however, and as shown the fixed cutter is formed with opposed sets 122 and 123 of V-shaped cutting teeth 124 adapted to respectively cooperate with opposed sets 125 and 126 of cutting teeth 127 formed on the movable cutter 121.

As in the case of the cutter unit 40, screws 128 on the fixed cutter 120 extending into longitudinal slots 129 in the movable cutter 121 serve to guide the latter during its reciprocatory movement, while a spring plate 130 overlying the movable cutter and maintained in engagement therewith by the screws 128 provides an advantageous means for insuring a proper shearing relationship between the cutting teeth 124 and 127 of the respective cutters.

Now of particular importance it is to be noted that for enabling the support of the cutter unit in divers positions there are formed in the arcuate portions 114 arcuate guide slots 131, either of which is adapted to receive guide lugs 132 and 133 on a cutter unit carrier block 134. This provision of guide slots 131 in both of the portions 114 and the arrangement of the driving mechanism, which will be presently described in detail, enables a supporting of the cutter unit on both sides of the ground wheel. Thus, if one of the pairs of cooperating sets of cutter teeth become worn the cutter unit may be reversed and placed on the other side of the ground wheel so that the other pair of cooperating sets of cutter teeth may be brought into operative position.

As shown most clearly in Fig. 10 the carrier block 134 includes a plate section 135, on which the lugs 132 and 133 are formed, adapted to overlie the outer face on one of the arcuate portions 114 depending on which side of the ground wheel it is desired to support the cutter unit. This plate section is formed with a central bore 136 in which is suitably secured a ball bearing 137 adapted to receive a stub shaft 138 at the outer end of which and preferably integral therewith is an actuating member 139 for the movable cutter 121. A U-shaped section 140 is also formed on the block extending at a right angle to the plate section 135. A lug 141 at the rear of the U-shaped section 140 is engageable with the arcuate portions 114 and cooperates with the lugs 132 and 133 in guiding and supporting the carrier block 134 as the latter is moved to divers adjusted positions.

Mounted on the stub shaft 138 to engage the internal gear 109 and thus rotate the cutter actuating member 139 is a pinion gear 142. Any suitable means such as the screw 143 in the hub 144 of the pinion 142 may be utilized to insure concurrent rotation of the pinion 142 and stub shaft 138.

For associating the cutter unit 98 with the carrier block 134 the fixed cutter 120 is formed at one end with a connecting plate 145 having a central opening 146 therein, with a bolt hole 147 at one side and an arcuate bolt receiving slot 148 at the other side thereof.

For associating the movable cutter 121 with the actuating member 139 a link 149 is connected at one end by a pivot pin 150 to the movable cutter 121 and formed at the other end with a hub bearing portion 151 adapted to receive a stub shaft 152. As shown most clearly in Fig. 7, this shaft 152 extends from either side of the link bearing 151 and has mounted at one end a roller collar 153 and at the other end a roller collar 154 respectively held on the shaft by screws 155 and 156 to cooperate with the actuating member 139 in a manner which will presently be described in detail. A bushing 157 may be advantageously fitted in the link bearing 151 to receive the stub shaft 152. Longitudinal movement of the stub shaft is arrested by the screw held roller collars 153 and 154 while an additional bearing surface is provided by a circumferential flange 158 on the shaft between the bearing 151 and collar 153.

With this construction when it is desired to associate the cutter unit 98 with the carrier block 134 to accomplish a vertical cut as shown in Fig. 5, a U-shaped spacer block 159 is placed on the outer face of the plate section 135, the connecting plate 145 of the fixed cutter 120 is placed on the U-shaped spacer block so that the opening 146 therein receives the actuating member 139, which is of cylindrical shape. Bolts 160 are then inserted through one of the arcuate guide slots 131 in the main yoke frame 105 to pass through holes 161 in the plate section 135 and thence through suitable holes 162 in the spacer block 159 to extend through the hole 147 and slot 148 respectively in the fixed cutter connecting plate 145. Nuts 163 on the bolts 160 function to lock the fixed cutter 120 in position and with the bolts 160 to fix to the carrier block 134 to the arcuate portions 114 of the main frame 105.

Concurrently with the positioning of the connecting plate 145 of the fixed cutter 120, the roller collar 153 on the link stud shaft 152 is inserted in an eccentric cam groove 164 formed in the face of the actuating cylinder 139. A channel bracket 165 fixed to the connecting plate 145, as by screws 166, and overlying the link 149 serves to maintain the collar 153 in the cam groove 164.

With this construction, upon movement of the ground wheel 99, as by the handle 100, the internal gear 109 engages the pinion 142 to rotate the latter and through the cooperation of the eccentric cam groove 164 and the collar 153 to reciprocate the movable cutter 121.

Because of the concentric relation of the arcuate guide slot 131 and the internal gear 109, the carrier block 134 and associated pinion 142 and cutter unit 98 may be readily adjusted in divers vertical positions with the pinion 142 and internal gear 109 remaining at all times in operative relation. A tightening of the nuts 163 will serve effectively to maintain the carrier block 134 and cutter unit 98 fixed in the desired vertical position.

To compensate for the arcuate movement of the carrier block during the above adjustments and thus achieve an absolutely vertical as distinguished from an angularly vertical support of the cutter unit even though the carrier block is moved an appreciable extent in the guide slot, the nut 163 on the bolt passing through the slot 148 in the connecting plate 145 may be loosened and the cutter unit swung to one side or the other as needed.

When it is desired to support the cutter unit in a horizontal position, as shown in Fig. 8, the nuts 163 and the entire cutter unit are withdrawn. The nuts are then replaced and slightly tightened on the bolts. Following this operation the carrier block 134 is slid around the arcuate slot 131 until the U-shaped section 140 of the carrier block 134 assumes a horizontal position to have the cutter unit 134 associated therewith.

To facilitate this association of the cutter unit the rim 107 of the ground wheel 99 is formed with a separable section 167 which may be removed to give ready access to the carrier block. Screws 168 passing through the separable section 167 and into the ground wheel web 110 provide a simple means for normally maintaining the separable section in position. As shown, a section 169 of the tire is also made separable in order that the same may be removed with the section 167 of the rim without removing the whole tire.

In operatively connecting the cutter unit 98 with the carrier block 134 and actuating member 139 in the horizontal position, the unit is first placed in such a way that the roller collar 154 adjacent the link 149 extends into a cam groove 170 formed in the cylindrical surface of the actuating member 139 and substantially in the form of a sine curve, see Fig. 8. Screws 171 are then inserted in the hole 147 and slot 148 in the connecting plate 145 of the fixed cutter 120 to engage in threaded holes 172 in the U-shaped section 140 of the carrier block 134, see Figs. 9 and 10, to fix the cutter unit thereto. A plate 173, see especially Fig. 10, formed with a slot 174 therein adapted to receive the roller collar 154 is then slid over the top of the U-shaped section 140 of the carrier block 134 to closely confine the collar 154 and by engagement with the shoulder 175 thereon maintain the collar 154 in the cam groove 170. Screws 176 may be used to fix the guiding and supporting plate 173 to the carrier block 134 not only when the cutter unit is horizontally supported but also when it is vertically supported.

When the cutter unit 98 is thus associated and the nuts 163 completely tightened to lock the carrier block in position, rotation of the ground wheel 99 will through cooperation of the internal gear 109 and pinion 142 cause the walls of the cylindrical cam groove 170 to engage the roller collar 154 and thus reciprocate the movable cutter.

If it is desired to raise or lower the cutter unit 98 when supported in the horizontal position it is merely necessary to slide the carrier block 134 upwardly in the arcuate guide slot 131 from the lowermost position shown in Fig. 8.

It is thus seen that with the form disclosed in Figs. 5 through 10 as well as with the forms disclosed in Figs. 1 through 4 and Fig. 11 a device is provided which not only is adapted to affectively operate to vertical cut lawn edges and to horizontal cut the lawn adjacent the lawn edge, but which also may be easily converted or adjusted from one type of operation to the other.

It is further seen, as in the forms first described, that the ground wheel 99 provides a housing 177 for enclosing the driving gears of the cutter unit.

Variations and modifications may be made within the scope of this invention and portions of the improvements may be used without others.

Having thus described the invention what is claimed as new is:

1. In a lawn trimmer the combination of a supporting frame; a ground wheel rotatably mounted on said frame; a gear on and rotatable with said ground wheel; a pinion meshing directly with said gear on the ground wheel; a reciprocating cutter unit supported by the frame and having at least one reciprocating member; and a single actuating member secured to and rotatable with said pinion, and connected directly to said cutter unit for reciprocating the same and for supporting said reciprocating member.

2. In a lawn trimmer the combination of a supporting frame; a ground wheel rotatably mounted on said frame; a gear on and rotatable with said ground wheel; a pinion meshing directly with said gear on the ground wheel; a reciprocating cutter unit supported by the frame in a vertical position; a single actuating member secured to and rotatable with said pinion, and connected directly to said cutter unit for reciprocating the same; and means for supporting said reciprocating cutter unit at various heights from the ground when in the vertical position.

3. In a lawn trimmer the combination of a supporting frame; a ground wheel rotatably mounted on said frame; a gear on and rotatable with said ground wheel; a pinion meshing directly with said gear on the ground wheel; an eccentric cam rotatable with and closely adjacent said pinion; a reciprocating cutter unit supported by the frame and comprising at least two blades; and a link connecting said eccentric with at least one of said blades for reciprocating the same.

4. In a lawn trimmer the combination of a supporting frame; a ground wheel rotatably mounted on said frame; a gear on and rotatable with said ground wheel; a pinion meshing directly with said gear on the ground wheel; a cam on said pinion; a reciprocating cutter unit supported by the frame and comprising at least two blades; and means connecting said cam with at least one of said blades for reciprocating the same.

5. In a lawn trimmer the combination of a ground wheel having a rim defining an open-sided housing; a main frame; a reciprocating cutter supported in a vertical plane at one side of the main frame and the ground wheel; a gear driving means for said reciprocating cutter unit entirely within said housing; and means for supporting said reciprocating cutter unit at various heights from the ground when in said vertical plane.

6. In a lawn trimmer the combination of a frame; a ground wheel rotatably mounted on said frame; an arcuate guide on said frame extending parallel with the vertical plane of said wheel; a reciprocating cutter unit; a carrier block for said cutter unit, movable on said guide to locate the cutter unit in any of a plurality of vertically spaced positions relative to said frame; an actuating member on said block for operating said cutter unit; a gear coaxial with said ground wheel and rotatable therewith; and a pinion on said carrier block and movable therewith to engage said gear in all of said vertically spaced positions to operate said actuating member.

7. In a lawn trimmer the combination of a frame; a ground wheel rotatably mounted on said frame; a gear coaxial with said ground wheel and rotatable therewith; a pinion supported by said frame and engageable directly with said gear; a reciprocating cutter unit supported by said frame and extending in a vertical plane at one side thereof and closely adjacent said wheel; and means secured to and rotatable with said pinion, and connected directly to said cutter unit for reciprocating the same.

8. In a lawn trimmer the combination of a frame; a ground wheel rotatably supported by said frame and having a peripheral rim; a reciprocating cutter supported by said frame and extending in a vertical plane closely adjacent said wheel; and means within said rim for reciprocating said cutter.

9. In a lawn trimmer the combination of a main frame; a ground wheel rotatably mounted on said frame; a guide on said frame and extending parallel with the vertical plane of said wheel; a cutter unit; means for securing said cutter unit to said guide in any of a plurality of vertically spaced positions; a gear coaxial with said ground wheel and rotatable therewith; and a pinion on said cutter unit and engaging said gear in all positions of said cutter unit on said guide.

10. In a lawn trimmer the combination of a main frame; a ground wheel rotatably mounted on said frame; a cutter unit; means for securing said cutter unit to said frame in a plurality of vertically spaced positions; a gear secured to said ground wheel and rotatable therewith; and only one pinion directly engaging said gear and connected directly to said cutter unit in all positions of said cutter unit on said guide.

11. In a lawn trimmer the combination of a main frame; a ground wheel rotatably mounted on said frame; a cutter unit; means for securing said cutter unit to said frame in a plurality of vertically spaced positions; and only one pair of gears connecting said ground wheel with said cutter unit in all positions of said cutter unit for operating the same.

LESTER W. SCOFIELD.